United States Patent [19]

Sayles

[11] Patent Number: 5,636,806
[45] Date of Patent: Jun. 10, 1997

[54] SEAT BELT RETRACTOR WITH ENERGY MANAGEMENT

[75] Inventor: Robert D. Sayles, Rochester, Mich.

[73] Assignee: TRW Vehicle Safety Systems Inc., Lyndhurst, Ohio

[21] Appl. No.: 547,623

[22] Filed: Oct. 24, 1995

[51] Int. Cl.$^6$ ................................................. B60R 22/28
[52] U.S. Cl. ........................................................ 242/379.1
[58] Field of Search .............................. 242/379.1, 376; 297/470, 471, 472; 280/805, 806

[56] References Cited

U.S. PATENT DOCUMENTS

| | | |
|---|---|---|
| 3,632,060 | 1/1972 | Balder . |
| 3,790,099 | 2/1974 | Beller ..................... 242/379.1 |
| 3,941,330 | 3/1976 | Ulrich ..................... 242/379.1 |
| 4,273,361 | 6/1981 | Takei et al. . |
| 4,305,554 | 12/1981 | Anderson ..................... 242/376 |
| 4,323,205 | 4/1982 | Tsuge et al. . |

Primary Examiner—John M. Jillions
Attorney, Agent, or Firm—Tarolli, Sundheim, Covell Tummino & Szabo

[57] ABSTRACT

A seat belt retractor (10) has a spool assembly (14) with a spool sleeve (34) on which a seat belt webbing (16) is wound. The spool sleeve (34) is supported for rotation in webbing retraction and webbing withdrawal directions (A, B). A ratchet wheel (48) is provided for stopping rotation of the spool sleeve (34) in the webbing withdrawal direction (B). The ratchet wheel (48) is rotatable with the spool sleeve (34) in the webbing retraction and webbing withdrawal directions (A, B). A blocking mechanism (72) prevents rotation of the ratchet wheel (48) in the webbing withdrawal direction (B) to stop rotation of the spool sleeve (34). A portion (62, 64) of said spool sleeve (34) can deform a portion (54, 58) of the ratchet wheel (48). When the ratchet wheel (48) is prevented from rotating by the blocking mechanism (72) and a withdrawal force above a predetermined amount is applied to the webbing (16), the spool sleeve (34) is permitted to rotate in the webbing withdrawal direction (B) relative to the ratchet wheel (48) by deformation of the ratchet wheel, thereby absorbing kinetic energy. In another embodiment, a member (120) is mounted to rotate with a ratchet wheel (110) as a unit. Deformation of the member (120) can occur to absorb energy when the ratchet wheel (110) is blocked. In another embodiment a wheel (330) and a ratchet wheel (358) are provided and deformation of each can occur. Other embodiments are disclosed.

21 Claims, 7 Drawing Sheets

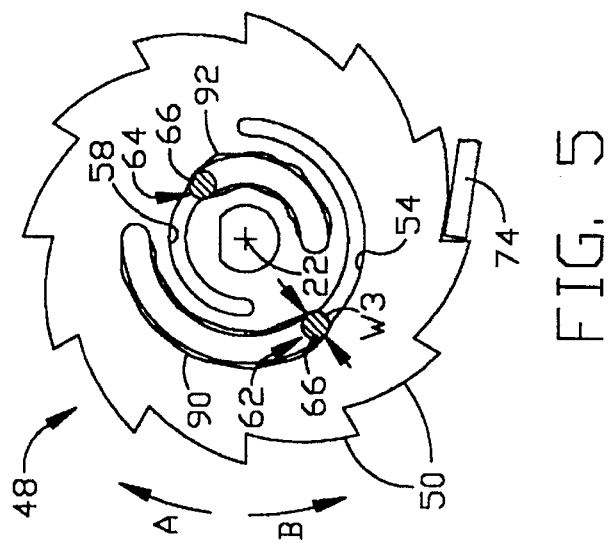

SEAT BELT RETRACTOR WITH ENERGY MANAGEMENT

BACKGROUND OF THE INVENTION

A known seat belt system for restraining an occupant of a vehicle includes seat belt webbing, a seat belt buckle, and a webbing retractor. A locking tongue is connected to the webbing and is releasably lockable in the buckle when the webbing is extended across the vehicle occupant. The retractor includes a spool upon which the webbing is wound. The spool rotates in a webbing withdrawal direction when the vehicle occupant extracts the webbing from the retractor. A rewind spring in the retractor rotates the spool in a webbing retraction direction to retract the webbing into the retractor.

When the vehicle experiences sudden deceleration, a vehicle occupant using the seat belt system applies a force against the webbing. The force which is applied to the webbing urges the spool to rotate in the withdrawal direction. The retractor includes a blocking mechanism which blocks withdrawal direction rotation of the spool in response to sudden vehicle deceleration. The blocking mechanism thus prevents further withdrawal of the webbing from the retractor, and the webbing restrains forward movement of the vehicle occupant.

SUMMARY OF THE INVENTION

The present invention relates to a seat belt webbing retractor which has a spool around which seat belt webbing is wound. The spool is supported for rotation in webbing withdrawal and webbing retraction directions. A ratchet wheel is rotatable with the spool in the webbing withdrawal and retraction directions. A blocking mechanism prevents rotation of the ratchet wheel and spool in the webbing withdrawal direction. An energy dissipating mechanism is provided for dissipating energy and for permitting the spool to rotate in the webbing withdrawal direction relative to the ratchet wheel in response to a webbing withdrawal force above a predetermined amount being applied to the spool when the ratchet wheel is prevented from rotating by the blocking mechanism. The energy dissipating mechanism includes a portion of the spool which deforms a portion of the ratchet wheel.

In one preferred embodiment, deformation occurs on a segment of a metal ratchet wheel. In another preferred embodiment, deformation occurs on a segment of a member mounted on a ratchet wheel. The member may be made of plastic, metal, or any other suitable material. In another preferred embodiment, deformation can occur on both a wheel and a ratchet wheel.

BRIEF DESCRIPTION OF THE DRAWINGS

Further features of the present invention will become apparent to those skilled in the art to which the present invention relates from reading the following specification with reference to the accompanying drawings, in which:

FIG. 2 is an exploded perspective view of the retractor shown in FIG. 1, with certain parts removed;

FIG. 5 is a view showing the parts illustrated in FIGS. 3 and 4 in an operational position;

DESCRIPTION OF PREFERRED EMBODIMENT

Figure 1:
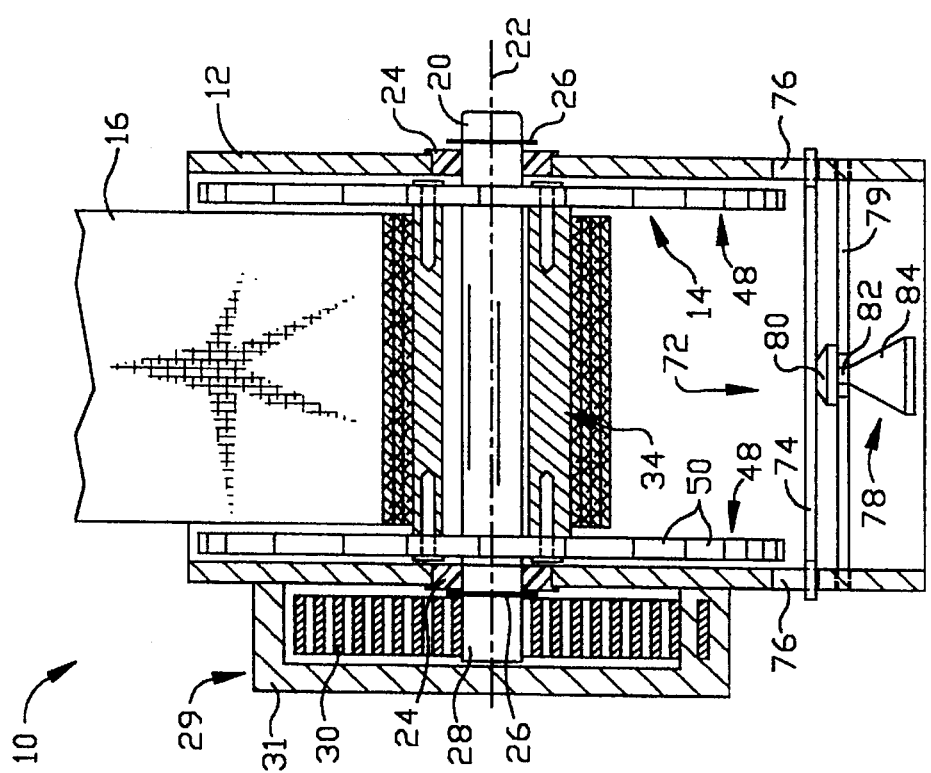
FIG. 1 is a sectional view of a first embodiment of a retractor according to the present invention.

A seat belt retractor 10 according to the present invention is shown in FIG. 1. The retractor 10 includes a metal frame 12 which is adapted to be mounted to the body of a vehicle (not shown). A spool assembly 14 of the retractor 10 stores a length of seat belt webbing 16 which is extendable to be positioned across a vehicle occupant (not shown).

The spool assembly 14 includes a metal shaft 20 having a D-shaped portion with a flat side 21 (FIG. 2). The shaft 20 is elongate along an axis 22 and is supported by two bearings 24 (FIG. 1) fitted in the frame 12. Two retainers 26 are engaged with the shaft 20 adjacent to respective sides of the frame 12 to prevent axial movement of the shaft 20 relative to the frame 12.

The shaft 20 has an end portion 28, which includes a slot and which projects out from one side of the frame 12. A drive assembly 29 is attached to the frame 12 around the end portion 28 of the shaft 20. The drive assembly 29 includes a spiral coil spring 30 which has one end extending into the slot of the end portion 28 and its other end affixed to a housing 31 of the drive assembly 29. The coil spring 30 (not shown in FIG. 2) biases the shaft 20 to rotate about the axis 22 in a first direction A (FIG. 2).

The spool assembly 14 also includes a metal spool sleeve 34 which is elongate and extends along the axis 22 about the shaft 20. The spool sleeve 34 has a general cylindrical outer surface 35, which is discontinuous at a slot 36 extending into the hollow interior 37 (FIG. 3) of the spool sleeve 34 and along the length of the spool sleeve 34. An internal ridge 38 projects radially toward the axis 22 from an inner surface 39 of the spool sleeve 34 and extends parallel to the axis 22 along the length of the spool sleeve 34.

An end of the webbing 16 (not shown in FIG. 2, for clarity) extends radially through the slot 36 in the spool sleeve 34 and is sewn into a loop about the shaft 20. The portion of the webbing 16 extending from the slot 36 is wound around the spool sleeve 34 for storage. When the shaft 20 and the spool sleeve 34 rotate in the first direction A, the webbing 16 is wound upon the spool sleeve 34. Thus, the first direction A is a webbing retraction direction. When the shaft 20 and the spool sleeve 34 rotate in a second direction B, which is a webbing withdrawal direction, the webbing 16 is unwound from the spool sleeve 34.

Figure 3:
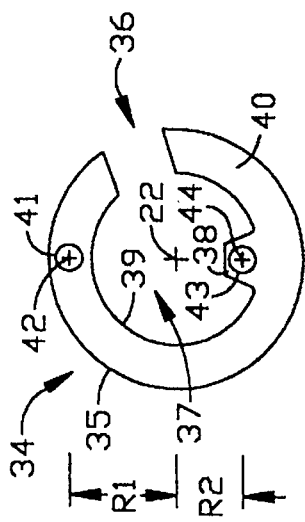
FIG. 3 is an end view of a part of the retractor of FIG. 1.

At each end of the spool sleeve 34 is a generally C-shaped planar axial end face 40 (only one shown in FIG. 3). The structural features at each end face 40 are identical in kind but are mirror-images of those at the other end face 40. Accordingly, only the structure at one end face 40 is discussed below.

First and second holes 41 and 43 extend parallel to the axis 22 into the spool sleeve 34 from the end face 40 for at least a portion of the overall axial length of the spool sleeve 34. The first hole 41 extends into the material of the spool sleeve 34 between the outer and inner surfaces 35 and 39 and has a center 42 located at a first radial distance R1 from the axis 22. The second hole 43 extends into the material of the spool sleeve 34 along the ridge 38 and has a center 44 located at a second radial distance R2 from the axis 22. The radial distance R2 is less than the radial distance R1. The holes 41 and 43 are spaced 180° from each other about the end face 40.

Two ratchet wheels 48 (FIG. 1) of the spool assembly 14 are in engagement with opposite end faces 40 of the spool sleeve 34. The ratchet wheels are made of metal, preferably with a hardness of $R_c$=36–42. Each ratchet wheel 48 has identical structural features, when viewed axially toward the spool sleeve 34. Thus, only one ratchet wheel 48 and its attachment mechanism are described below with the understanding that the same structural features and attachment mechanism are present for the other ratchet wheel 48.

Each ratchet wheel 48 (FIG. 4) is disk-like and has an annular array of teeth 50 located about its outer periphery. Each tooth 50 has a radially extending abutment face and an intersecting sloped face. The shaft 20 extends through a generally D-shaped center hole 52 in the ratchet wheel 48 on the axis 22. The ratchet wheel 48 is rotationally fixed to the shaft 20.

A first arcuate slot 54 extends through the ratchet wheel 48 and extends approximately 270° about the axis 22. The first slot 54 has a center arc median line M1 located between concentric, arcuate inner and outer edges of the first slot 54 and extending along the length of the first slot 54. The median line M1 is located at the same radial distance R1 from the axis 22 as the center 42 of the first hole 41 (FIG. 3) of the spool sleeve 34. Thus, the first slot 54 overlaps the first hole 41.

The first slot 54 (FIG. 4) has a width W1 between its inner and outer edges, measured along a radius from the axis 22, for a majority of the length of the first slot 54. At one end, the first slot 54 has an enlarged rounded head end 56. The head end 56 has a width W2 which is slightly larger than the width W1.

Figure 4:
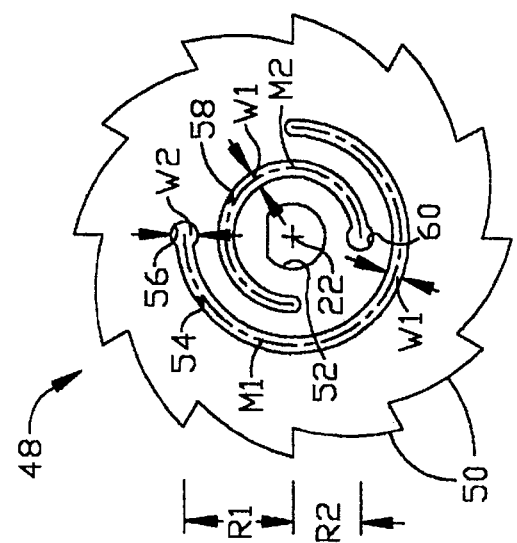
FIG. 4 is an end view of another part of the retractor of FIG. 1.

A second arcuate slot 58 extends through the ratchet wheel 48 and extends approximately 270° about the axis 22. The second slot 58 has a center arc median line M2 located between concentric, arcuate inner and outer edges of the second slot 58 and extending along the length of the second slot 58. The median line M2 is located at the same radial distance R2 from the axis 22 as the center 44 of the second hole 43 (FIG. 3) of the spool sleeve 34. Thus, the second slot 58 overlaps the second hole 43, and is concentric with and radially closer to the axis 22 than the first slot 54 (FIG. 4).

The second slot 58 has a width W1 between its inner and outer edges, measured along a radius from the axis 22 for a majority of the length of the second slot 58. This width is the same as the width W1 of the first slot 54. At one end, the second slot 58 has an enlarged rounded head end 60. The head end 60 has a width W2 which is the same as the width W2 of the head end 56. Thus, the width W2 of the head end 60 is slightly larger than the width W1 of the majority of the second slot 58. The second slot 58 is angularly offset from the first slot 54 such that the head end 56 of the first slot 54 is disposed 180° from the head end 60 of the second slot 58.

First and second fasteners 62 and 64 (FIG. 2) attach the ratchet wheel 48 to the spool sleeve 34 at the adjacent end face 40. The material of the fasteners has a hardness of preferably $R_c$=44–50. The first and second fasteners 62 and 64 are identical and only the first fastener 62 is described in detail, with the understanding that the description applies to the second fastener 64.

The first fastener 62 may be any suitable fastener, such as a metal screw. The first fastener 62 has a shank 66 which is threaded at a tip portion. The shank 66 is in threaded engagement with the material of the spool sleeve 34 at the first hole 41 such that the first fastener 62 is prevented from moving relative to the spool sleeve 34. Other means of fixing the first fastener 62 to the spool sleeve 34 may be used. As an example, the first fastener 62 may be fluted, knurled or smooth, and the first fastener 62 could be pressed into the first hole 41.

A portion of the shank 66 projects from the end face 40 of the spool sleeve 34, and is located in the head end 56 (FIG. 4) of the first slot 54 of the ratchet wheel 48. The portion of the shank 66 which is located within the head end 56 has a diametrical width W3 (FIG. 2) which is slightly less than the width W2 of the head end 56 and which is slightly greater than the width W1 of the majority of the first slot 54.

A head 68 of the first fastener 62 abuts a surface of the ratchet wheel 48 presented away from the spool sleeve 34. The head 68 has a diametrical width which is greater than the widths W1 and W2 so that the head 68 retains the ratchet wheel 48 in abutment with the spool sleeve 34 and prevents axial movement of the ratchet wheel 48 away from the spool sleeve 34. The head 68 presses the ratchet wheel 48 against the end face 40 of the spool sleeve 34 only with a force sufficient to prevent axial play (i.e., the first fastener 62 is not overly tightened).

In a similar manner, the shank 66 of the second fastener 64 is in threaded engagement with the material of the spool sleeve 34 at the second hole 43. Thus, the second fastener 64 is fixed relative to the spool sleeve 34. Similar to the first fastener 62, the second fastener 64 may be fixed to the spool sleeve 34 by other means.

A portion of the shank 66 of the second fastener 64 projects from the end face 40 of the spool sleeve 34 and into the head end 60 (FIG. 4) of the second slot 58. The portion of the shank 66 (FIG. 2) which is located in the head end 60 has a diametrical width W3 which is equal to the width W3 of the first fastener 62. Thus, the width W3 of this portion of the shank 66 is slightly less than the width W2 of the head end 60 and slightly greater than the width W1 of the majority of the second slot 58. The head 68 of the second fastener 64 has a diametrical width W3 which is greater than the widths W1 and W2 so that the second fastener 64 also retains the ratchet wheel 48 in axial abutment with the spool sleeve 34, but only with a force sufficient to prevent axial play.

In the preferred embodiment, the first and second fasteners 62 and 64 are screws fixed to the spool sleeve 34. The fasteners 62 and 64, however, may be formed in one piece with the spool sleeve 34. In that case, the ratchet wheel 48 would be axially retained on the spool sleeve 34 by such means as threaded nuts, push-on retainers or expansion staking of the fasteners.

The retractor 10 includes a blocking mechanism 72 (FIG. 2) for preventing rotation of the spool assembly 14 in the webbing withdrawal direction B. The blocking mechanism 72 may be of various constructions and configurations. The illustrated blocking mechanism 72 includes a lock bar 74 which is pivotally supported in apertures 76 in opposite side walls of the frame 12. The lock bar 74 has a release (rest) position (FIG. 1) in which the lock bar 74 is pivoted downward away from the teeth 50 of the ratchet wheels 48. The lock bar 74 has an engaged (blocking) position (FIG. 5) in which the lock bar 74 is pivoted upward to engage radially extending abutment faces of the teeth 50 and to prevent the ratchet wheels 48 from rotating in the webbing withdrawal direction B (i.e., locking the retractor 10).

The blocking mechanism 72 (FIG. 1) has a pendulum 78 which is supported in a support bar 79 affixed to the frame 12. The pendulum 78 has a head 80, a neck 82 and a body 84. The head 80 is located beneath the lock bar 74 and is engageable with the lock bar 74 upon tipping of the pendulum 78 to push the lock bar 74 upward from its release position towards its engaged position. The neck 82 extends between the head 80 and the body 84 and passes though an opening in the support bar 79. The body 84 is an inertia mass and is made out of a relatively heavy material, such as lead. The body 84 is dimensioned and contoured such that the body 84 moves and tips the head 80 in response to a vehicle collision (e.g., a vehicle deceleration above a predetermined amount) during which it is desired to restrain the vehicle occupant with the webbing 16.

When a vehicle occupant is seated in a vehicle, the webbing 16 is withdrawn from the retractor 10 and secured across the vehicle occupant. Upon the occurrence of a vehicle collision (e.g., a change in vehicle velocity above a predetermined amount), the pendulum 78 tips and the head 80 pushes the lock bar 74 upward. The lock bar 74 engages a tooth 50 of each ratchet wheel 48. Thus, the ratchet wheels 48 are prevented from rotating in the webbing withdrawal direction B and the vehicle occupant is restrained.

As the vehicle occupant continues to move forward, the occupant presses against the webbing 16, and the tension force applied to and by the webbing increases. This tension force is transmitted to the spool sleeve 34. The spool sleeve 34 will thus have a force applied to it which tends to rotate the spool sleeve 34 in the webbing withdrawal direction B relative to the blocked ratchet wheels 48. The shanks 66 of the first and second fasteners 62 and 64, which are affixed to the spool sleeve 34, press against the tapering surface between the width W2 and the width W1 of the respective slots 54 and 58. If the force with which the first and second fasteners 62 and 64 press is below a predetermined amount, the first and second fasteners 62 and 64, and thus the spool sleeve 34, do not move relative to the blocked ratchet wheels 48.

However, if the force applied by the webbing 16 to the spool sleeve 34 is sufficiently large, the first and second fasteners 62 and 64 will begin to move relative to the ratchet wheels 48 along the respective slots 54 and 58. Specifically, the outer surfaces of the shanks 66 of the fasteners 62 and 64 bear upon the surfaces of the respective slots 54 and 58, and the material of the ratchet wheels 48 adjacent to the slots 54 and 58 deforms and yields (FIG. 5). The shanks 66 push the material of the ratchet wheels 48, creating deformed segments 90 and 92, to expand the width of the respective slots 54 and 58 to the width W3 of the shanks 66 to permit passage of the shanks 66 along the respective slots 54 and 58. The work done by the first and second fasteners 62 and 64 in deforming the ratchet wheel material dissipates or absorbs the energy from the tensioned webbing 16.

The deformation which occurs on the ratchet wheels 48 may be of various types. Specifically, the deformation may include radial displacement of the ratchet wheel material, a curling of the ratchet wheel material outwardly from the original plane of the ratchet wheel 48, and/or cutting of the ratchet wheel material away from the ratchet wheel 48. The deformation shown in FIG. 5 (deformation having occurred along approximately half of the length of the slots) is for illustrative purposes only and is only representative of the proportionate amount of deformation which may occur.

As the first and second fasteners 62 and 64 travel around their respective slots 54 and 58, the spool sleeve 34 is permitted to move relative to the blocked ratchet wheels 48 a distance which is substantially equal to a rotation of 270°. Thus, a predetermined amount of the webbing 16 is permitted to be unwound from the spool sleeve 34 under the tension force applied by the webbing 16, and the vehicle occupant is permitted to move forward a predetermined amount.

The deformation of the ratchet wheels 48 is not instantaneous but instead occurs over a period of time. During this time period, the webbing 16 does not fully block forward movement of the vehicle occupant. Occupant deceleration resulting from engagement with the webbing 16 occurs over a longer period of time than it would occur if the webbing 16 were connected to a spool sleeve fixed to its ratchet wheels. In addition, the deformation of the ratchet wheels 48 reduces the webbing restraining force acting on the vehicle occupant. More crash energy is dissipated by the retractor 10, and the amount of force transferred through the webbing 16 to the vehicle occupant is reduced. Total energy is dissipated over a longer period of time; therefore the peak forces are reduced.

The principle of conservation of energy states that the total occupant kinetic crash energy is ½ m $(v_i^2-v_f^2)$, where m is the occupant's mass, $v_i$ is the velocity of the vehicle occupant at the beginning of the crash and $v_f$ is the velocity of the vehicle occupant at the end of the crash. The total occupant crash energy is dissipated by performing work on the vehicle occupant. Work, which is a force applied over a distance, must be performed on the vehicle occupant to stop the occupant's motion. In a crash, work is performed on a vehicle occupant in a variety of means, including physical absorption by the occupant, interaction between the occupant and the vehicle seat, and interaction between the occupant and the webbing 16. Deformation of the ratchet wheels 48 results in reapportionment of the work so that more work is performed by the interaction between the occupant and the webbing 16 and less is physically absorbed by the occupant. Thus, some kinetic energy of the moving vehicle occupant is absorbed or dissipated by the deformation of the ratchet wheels 48.

Figure 6:
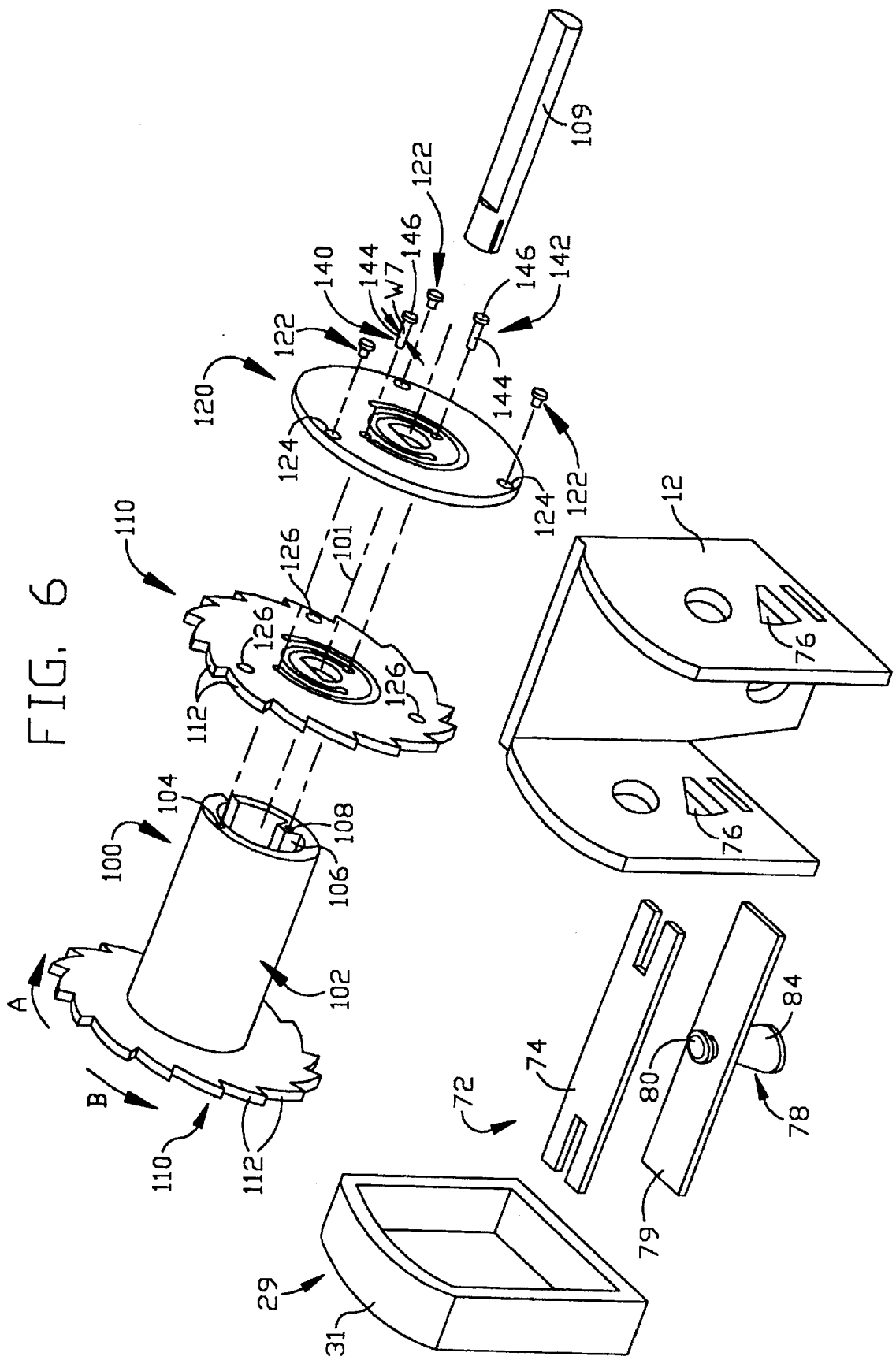
FIG. 6 is an exploded perspective view of a second embodiment of the present invention.

A second embodiment of the present invention is shown in FIG. 6. The second embodiment is similar to the first embodiment in that a seat belt webbing, a frame, a drive assembly and a blocking mechanism of the second embodiment are identical to those of the first embodiment. Accordingly, these parts are discussed below with reference numbers identical to those used for the first embodiment and with the understanding that the structure and function these parts are as described for the first embodiment. Only a spool assembly 100 of the second embodiment differs from the spool assembly 14 of the first embodiment.

The spool assembly 100 stores a length of webbing (not shown in FIG. 6) and is rotatable in a webbing retraction direction A and a webbing withdrawal direction B. The spool assembly 100 includes a spool sleeve 102 which is identical to the spool sleeve 34 of the first embodiment. The spool sleeve 102 has a first hole 104 which extends into the material of the spool sleeve 102 in a direction parallel to a longitudinal spool axis 101. The center of the first hole 104 is located at a first radial distance R1 from the axis 101.

An internal ridge 106 extends along the inner surface of the spool sleeve 102 in a direction parallel to the axis 101. A second hole 108 extends into the material of the internal ridge 106 of the spool sleeve 102 in a direction parallel to the axis 101. A center of the second hole 108 is located at a second radial distance R2 from the axis 101, which is less than the first radial distance R1. The distances R1 and R2 are the same as the distances R1 and R2 previously described with respect to the first embodiment.

A shaft 109 of the spool assembly 100 is identical to the shaft 20 of the first embodiment. The shaft 109 extends through the hollow interior of the spool sleeve 102 such that the spool sleeve 102 is concentric about the shaft.

Figure 7:
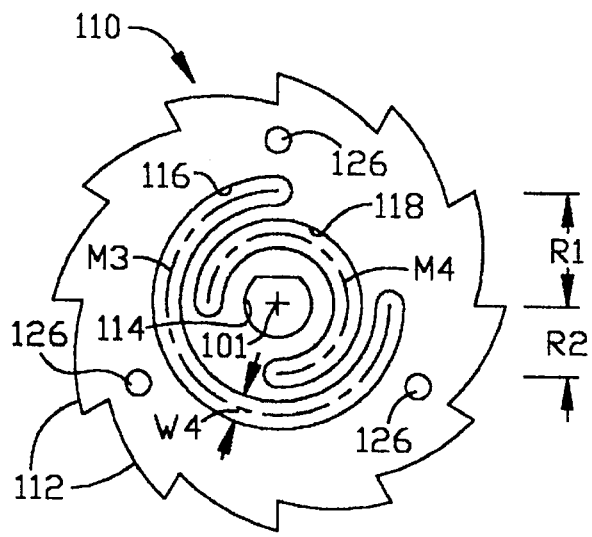
FIG. 7 is an end view of a part of the retractor of FIG. 6.
Figure 9:
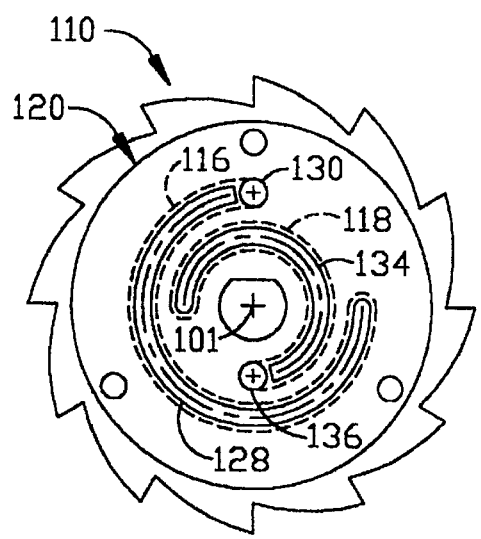
FIG. 9 is a view showing the parts illustrated in FIGS. 7 and 8 assembled together.

Two metal ratchet wheels 110 are in engagement with opposite axial ends of the spool sleeve 102. The ratchet wheels 110 have identical structural features, when viewed axially toward the spool sleeve 102, and only one ratchet wheel 110 and its attachment mechanism is described below. Each ratchet wheel 110 (FIG. 7) has an annular array of teeth 112 extending around its outer periphery. The shaft 109 of the spool assembly 100 extends through a generally D-shaped center hole 114 of the ratchet wheel 110. The ratchet wheel 110 is rotationally fixed to the shaft 109.

A first arcuate slot 116 extends through the ratchet wheel 110 and extends approximately 270° about the axis 101. The first slot 116 has a center arc median line M3 located between concentric, arcuate inner and outer edges of the first slot 116 and extending along the length of the first slot 116. The median line M3 is located at the same radial distance R1 from the axis 101 as the center of the first hole 104 of the spool sleeve 102. Thus, the first slot 116 overlaps the first hole 104. The first slot 116 has a width W4 between its inner and outer edges, as measured along a radius from the axis 101. The width W4 is substantially constant along the entire length of the first slot 116.

A second arcuate slot 118 extends through the ratchet wheel 110 and extends approximately 270° about the axis 101. A center arc median line M4 of the second slot 118 is located between concentric, arcuate inner and outer edges at the same radial distance R2 from the axis 101 as the center of the second hole 108 of the spool sleeve 102. Thus, the second slot 118 overlaps the second hole 108, and is concentric with and radially closer to the axis 101 than the first slot 116. The second slot 118 has a width which is the same as the width W4 of the first slot 116, as measured between its inner and outer edges along a radial line. The second slot 118 is angularly offset from the first slot 116 by approximately 180°.

Figure 8:
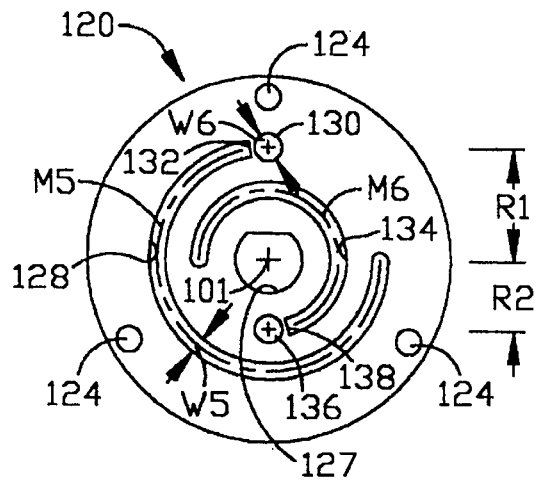
FIG. 8 is an end view of another part of the retractor of FIG. 6.

In the second embodiment, two piggyback members 120 (only one shown, FIG. 8) of an appropriate material are provided for rotation with the ratchet wheels 110. Preferably, the piggyback members 120 are made of plastic. The piggyback members 120 are identical and only one piggyback member is described below. The piggyback member 120 is mounted on the ratchet wheel 110 by three fasteners 122 (FIG. 6). The fasteners 122 may be of any suitable type, such as rivets or screws. Each fastener 122 extends through a respective mount hole 124 in the piggyback member 120 and through a respective mount hole 126 in the ratchet wheel 110. The shaft 109 extends through a D-shaped center hole 127 (FIG. 8) in the piggyback member 120. The piggyback member 120 rotates with the ratchet wheel 110, such that the ratchet wheel 110 and its piggyback member 120, together, can be considered to be a unit and can be referred to as a ratchet wheel.

The piggyback member 120 has a first arcuate slot 128 which extends through the piggyback member 120 and around the axis 101. The first slot 128 has a center arc median line M5 which is located between concentric, arcuate inner and outer edges of the first slot 128 and which extends along the length of the first slot 128. The median line M5 is located at the same radial distance R1 from the axis 101 as the center of the first hole 104 of the spool sleeve 102 and the median line M3 of the first slot 116 of the ratchet wheel 110. The first slot 128 has a width W5, measured between its inner and outer edges along a radial line. The width W5 is less than the width W4.

A first circular hole 130 extends through the piggyback member 120 and is located adjacent to one end of the first slot 128. The first hole 130 has a diametrical width W6. A center of the first hole 130 is aligned with the median line M5 of the first slot 128 and is located at the radial distance R1 from the axis 101. A thin web of material 132 is located between the first hole 130 and the first slot 128. In general, the combined arc length of the first slot 128, the web of material 132 and the first hole 130 extends approximately 270° about the axis 101. The first slot 128 and the first hole 130 of the piggyback member 120 overlap the first slot 116 of the ratchet wheel 110.

A second arcuate slot 134 extends through the piggyback member 120 and around the axis 101. A center arc median line M6 of the second slot 134 is located between concentric, arcuate inner and outer edges of the second slot 134 and extends along the length of the second slot 134. The median line M6 is located at the same radial distance R2 from the axis 101 as the center of the second hole 108 of the spool sleeve 102 and the median line M4 of the second slot 118 of the ratchet wheel 110. The second slot 134 has a width between its inner and outer edges which is equal to the width W5 of the first slot 128.

A second circular hole 136 extends through the piggyback member 120 and is located adjacent to one end of the second slot 134. The second hole 136 has a diametrical width which is the same as the diametrical width W6 of the first hole 130. A center of the second hole 136 is aligned with the median line M6 of the second slot 134 and located at the radial distance R2 from the axis 101. A thin web of material 138 is located between the second hole 136 and the second slot 134.

The combined arc length of the second slot 134, the web of material 138 and the second hole 136 is approximately 270°. Further, the second slot 134, the web of material 138 and the second hole 136 are angularly offset relative to the first slot 128, the web of material 132 and the first hole 130, respectively, by approximately 180°. The second slot 134 and the second hole 136 of the piggyback member 120 overlap the second slot 118 of the ratchet wheel 110.

First and second fasteners 140 and 142 (FIG. 6) are associated with each ratchet wheel 110. Each pair of fasteners 140, 142 attaches a respective ratchet wheel 110 and its piggyback member 120 to the spool sleeve 102. Each pair of fasteners is identical and has identical functions at its respective ratchet wheel 110 and piggyback member 120. Accordingly, only one pair of fasteners is discussed with the understanding that identical structural features and functions are present for the other pair of fasteners. The first and second fasteners 140 and 142 are identical to each other, and the same reference numbers are used to identify identical structure.

The first fastener 140 may be any suitable fastener, such as a threaded screw. The first fastener 140 has a threaded shank 144 which is in threaded engagement with the material of the spool sleeve 102 at the first hole 104. Thus, the first fastener 140 is fixed relative to the spool sleeve 102. Other means of fixing the first fastener 140 to the spool sleeve 102 may be used. As examples, the first fastener 140 may be fluted, knurled or smooth and the first fastener 140 could be pressed into the first hole 104.

A portion of the shank 144 projects from the spool sleeve 102 in a direction parallel to the axis 101. This portion extends through the first slot 116 of the ratchet wheel 110 and the first hole 130 of the piggyback member 120. The diametrical width W7 of this portion of the shank 144 is less than the width W4 of the first slot 116 and less than the width W6 of the first hole 130. However, the width W7 of the portion of the shank 144 is greater than the width W5 of the first slot 128 of the piggyback member 120.

A head 146 of the first fastener 140 has an diametrical width which is greater than the widths W4, W5 and W6. Thus, the head 146 of the first fastener 140 prevents axial movement of the ratchet wheel 110 and its piggyback member 120 relative to the spool sleeve 102. The head 146 presses the ratchet wheel 110 and its piggyback member 120 against the spool sleeve 102 only with a force sufficient to prevent axial play (i.e., the first fastener 140 is not overly tightened).

Similarly, the shank 144 of the second fastener 142 is in threaded engagement with the material of the spool sleeve 102 at the second hole 108. Similar to the first fastener 140, the second fastener 142 may be fixed to the spool sleeve 102 by other means. A portion of the shank 144 of the second fastener 142 extends through the second slot 118 and through the second hole 136. This portion of the shank 144 also has a width W7 which is less than the width W4 of the second slot 118 and less than the width W6 of the second hole 136 of the piggyback member 120. However, the width W7 of this portion of the shank 144 is greater than the width W5 of the second slot 134 of the piggyback member 120.

The first and second fasteners 140 and 142 are preferably screws fixed to the spool sleeve 102. Thus, the spool sleeve 102 and the first and second fasteners 140 and 142 act as a unit. The fasteners 140 and 142 may alternatively be formed in one piece with the spool sleeve 102. The ratchet wheel 110 and its piggyback member 120 would then be axially retained on the spool sleeve 102 by such means as threaded nuts, push-on retainers or expansion of the fasteners.

The webs of material 132 and 138 normally retain the first and second fasteners 140 and 142 within the first and second holes 130 and 136, respectively, as the spool assembly 100 is rotated. This normal retention is effective so long as a rotational force biasing the spool sleeve 102 to rotate in the webbing withdrawal direction B relative to the ratchet wheel 110 remains below a predetermined amount. Thus, the first and second fasteners 140 and 142 rotate with the spool sleeve 102 and cause the ratchet wheels 110 to rotate with the rest of the spool assembly 100.

Upon the occurrence of a vehicle collision (e.g., a change in vehicle velocity above a predetermined amount), the pendulum 78 tips and the head pushes the lock bar 74 upward. The lock bar 74 engages a tooth 112 of each of the ratchet wheels 110 and prevents rotation of the ratchet wheels 110 in the webbing withdrawal direction B. The shank surfaces of the first and second fasteners 140 and 142 bear against the respective webs of material 132 and 138. If the bearing force is below the predetermined amount, the webs of material 132 and 138 remain intact and the first and second fasteners 140 and 142 remain rotationally stationary relative to the ratchet wheels 110 and the piggyback members 120. Thus, the spool sleeve 102 is held stationary relative to the blocked ratchet wheels 110. Further withdrawal of the webbing 16 is prevented, and the vehicle occupant is restrained by the webbing.

Figure 10:
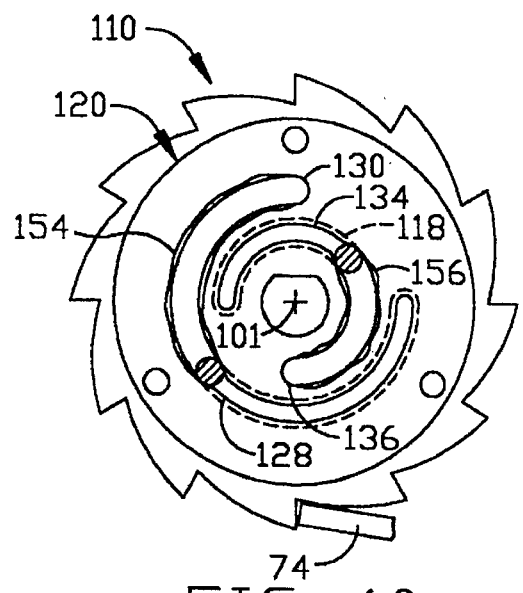
FIG. 10 is a view showing the parts illustrated in FIG. 9 in an operational position.

Upon the occurrence of a vehicle deceleration sufficient to cause the predetermined amount of tension force in the webbing, as described above with respect to the first embodiment of the invention, the spool sleeve 102 tends to rotate relative to the blocked ratchet wheels 110. The first and second fasteners 140 and 142 bear upon the respective webs of material 132 and 138 with sufficient force to rupture the webs of material 132 and 138 (FIG. 10). The first and second fasteners 140 and 142 are guided to rotate along the respective first and second slots 116 and 118 of the ratchet wheels 110 because the widths W4 of these respective slots are greater than the widths W7 of the portions of the shanks 144. However, the widths W5 of the first and second slots 128 and 134 of the piggyback member 120 cause a resistance to movement of the first and second fasteners 140 and 142 through the respective slots 128 and 134.

Specifically, because the piggyback member 120 is fixed to the ratchet wheel 110, the first and second fasteners 140 and 142 must deform the material of the piggyback member 120 along the respective slots 128 and 134 as the first and second fasteners 140 and 142 rotate relative to the piggyback member 120. As the fasteners 140 and 142 move along the respective slots 128 and 134, the material of the piggyback member 120 adjacent to the respective slots deforms or yields. Deformed segments 154 and 156 are created.

The deformation may include radial movement of the material, axial curling of the material away from the original plane of the piggyback member 120, and/or shearing of the material. The deformation shown in FIG. 10 (deformation having occurred along approximately half of the length of the slots) is for illustrative purposes only and is only representative of the proportionate amount of deformation which may occur.

The spool sleeve 102 is permitted to rotate relative to the blocked ratchet wheels 110 a distance which is substantially equal to a rotation of 270° as the first and second fasteners 140 and 142 are guided along the respective slots 116 and 118 of the ratchet wheels 110. The deformation of the material dissipates or absorbs kinetic energy which would otherwise be transferred to the vehicle occupant by the webbing, as described above with respect to the first embodiment. Thus, the maximum tension force which is perceived by the vehicle occupant in the webbing is reduced.

The piggyback member 120 can be manufactured with differing specifications which are suitable to different load and/or energy absorbing situations. A piggyback member 120 with specific characteristics can be selected for use in a particular retractor intended for a specific use.

Figure 11:
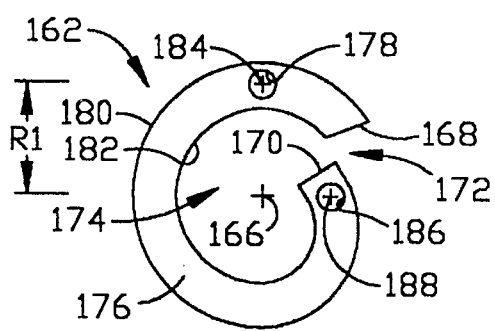
FIG. 11 is an end view of a part of a retractor comprising a third embodiment of the present invention.
Figure 12:
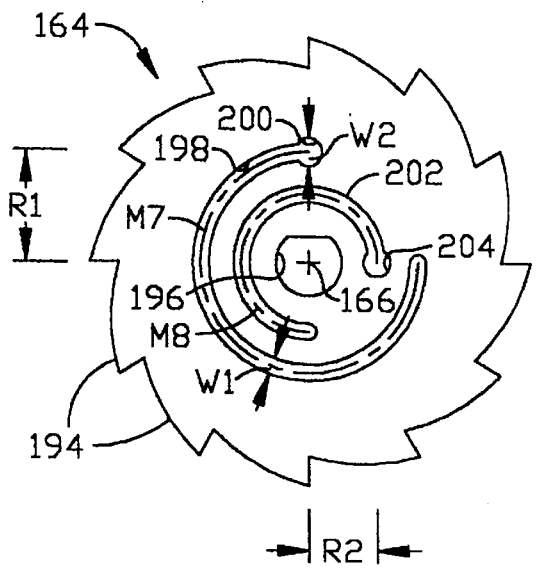
FIG. 12 is an end view of another part of the retractor comprising the third embodiment.
Figure 13:
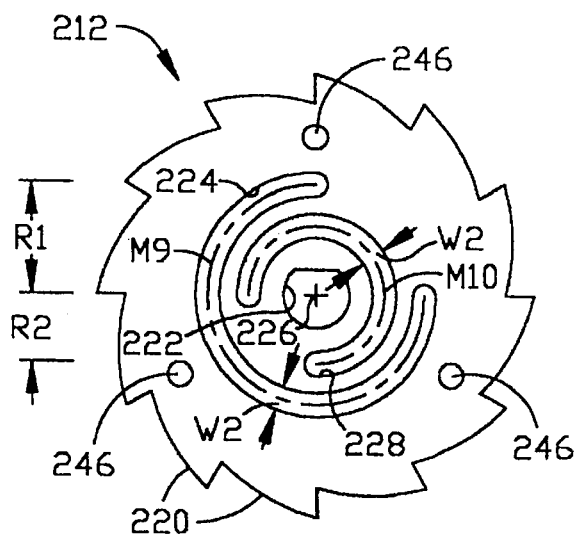
FIG. 13 is an end view of a part of a retractor comprising a fourth embodiment of the present invention.
Figure 14:
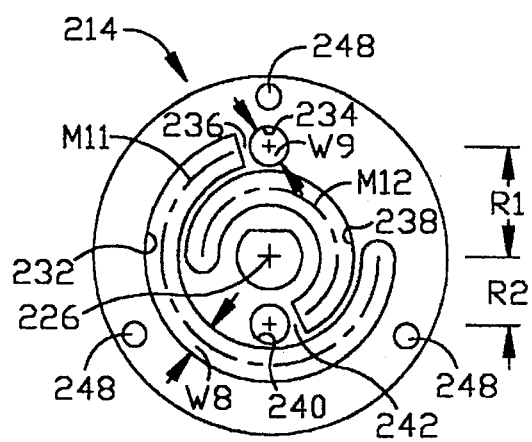
FIG. 14 is an end view of another part of the retractor comprising the fourth embodiment.
Figure 15:
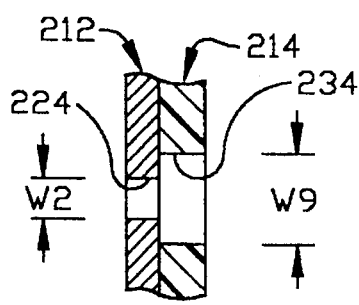
FIG. 15 is a section view, partially broken away, showing the parts of FIGS. 13 and 14 assembled together.

Parts of a third embodiment of the present invention are shown in FIGS. 11 and 12. The third embodiment is similar to the first embodiment in that a seat belt webbing, a frame, a drive assembly and a blocking mechanism of the third embodiment are identical to those of the first embodiment (FIG. 1). These parts are not illustrated, but, it is to be understood that the structure and function of these parts are as described for the first embodiment. Only a spool assembly of the third embodiment differs from the spool assembly 14 of the first embodiment. The spool assembly of the third embodiment has a spool sleeve 162 (FIG. 11), two ratchet wheels 164 (FIG. 12, only one shown), a shaft (not shown) and two sets of fasteners (not shown), which are all preferably metal. The shaft is identical to the shaft 20 (FIG. 2) of the first embodiment. The spool sleeve 162 (FIG. 11) is elongate and extends along an axis 166 about the shaft. The spool sleeve 162 has first and second edge portions 168 and 170 that extend parallel to the axis 166 and that bound a slot 172. The slot 172 extends through the spool sleeve 162 into an interior 174.

The spool sleeve 162 is cylinder-shaped along most of its circumferential extent. However, a portion of the spool sleeve 162 adjacent to the second edge portion 170 spirals radially inward. Accordingly, the second edge portion 170 is radially closer to the axis 166 than the first edge portion 168.

At each end of the spool sleeve 162 is a planar axial end face 176 (only one shown). The structural features at each end face 176 are identical in kind to but are mirror images of those at the other end face 176. Accordingly, only the structure at one end face 176 is discussed. The end face 176 has a general spiral shape.

A first hole 178 extends into the material of the spool sleeve 162 from the end face 176 in a direction parallel to the axis 166 between outer and inner surfaces 180 and 182 of the spool sleeve 162. The first hole 178 is located a short distance away from the first edge portion 168 and has a center 184 located at a radial distance R1.

A second hole 186 extends into the material of the spool sleeve 162 parallel to the axis 166 between the outer and inner surfaces 180 and 182. The second hole 186 is located adjacent to the second edge portion 170 and has a center 188 located at a radial distance R2 from the axis 166. The radial distances R1 and R2 are the same as the radial distances R1 and R2 previously described with respect to the first embodiment. Accordingly, R1 is greater than R2. A radial line to the center 188 of the second hole 186 is offset from a radial line to the center 184 an arc-distance of approximately 90°.

An end of the webbing (not shown in FIGS. 11 and 12) extends radially through the slot 172 in the spool sleeve 162 and is sewn into a loop about the shaft (not shown). The portion of the webbing extending from the slot 172 is wound about the spool sleeve 162 for storage.

The two ratchet wheels 164 (FIG. 12, only one shown) are in engagement with the opposite end faces 176 of the spool sleeve 162. Each ratchet wheel 164 has identical structural features, when viewed axially toward the spool sleeve 162. Thus, only one ratchet wheel 164 and its attachment mechanism are described below with the understanding that the same structural features and attachment mechanism are present for the other ratchet wheel 164.

The ratchet wheel 164 preferably has a hardness of $R_c$=36–42. The ratchet wheel 164 is disc-like and has an annular array of teeth 194 located about its outer periphery.

Each tooth 194 has a radially extending abutment face and an intersecting sloped face. The shaft (not shown) extends through a generally D-shaped center hole 196 in the ratchet wheel 164 on the axis 166 and the ratchet wheel is fixed for rotation with the shaft.

A first arcuate slot 198 extends through the ratchet wheel 164 and extends approximately 270° about the axis 166. The first slot 198 has a center arc median line M7 located between concentric, arcuate inner and outer edges of the first slot 198 and extending along the length of the first slot 198. The median line M7 is located at the same radial distance R1 from the axis 166 as the center 184 of the first hole 178 (FIG. 11) of the spool sleeve 162. Accordingly, the first slot 198 overlaps the first hole 178.

The first slot 198 (FIG. 12) has a width W1 between its inner and outer edges, measured along a radius from the axis 166, for a majority of the length of the first slot 198. At one end, the first slot 198 has an enlarged rounded head end 200. The head end 200 has a width W2 which is slightly larger than the width W1. The widths W1 and W2 of this third embodiment are the same as the widths W1 and W2 previously described with respect to the first embodiment.

A second arcuate slot 202 extend through the ratchet wheel 164 and extends approximately 270° about the axis 166. The second slot 202 has a center arc median line M8 located between concentric, arcuate inner and outer edges of the second slot 202 and extending along the length of the second slot 202. The median line M8 is located at the same radial distance R2 from the axis 166 as the center 188 (FIG. 11) of the second hole 186 of the spool sleeve 162. Accordingly, the second slot 202 overlaps the second hole 186, and is concentric with and radially closer to the axis 166 than the first slot 198.

The second slot 202 has a width W1 between its inner and outer edges, measured along a radius from the axis 166, for a majority of the length of the second slot 202. This width W1 is the same as the width W1 of the first slot 198. At one end, the second slot 202 has an enlarged rounded head end 204. The head end 204 has a width W2 which is the same as the width W2 of the head end 200. Accordingly, the width W2 of the head end 204 is slightly larger than the width W1 of the majority of the second slot 202. The second slot 202 is angularly offset from the first slot 198 such that the head end 200 of the first slot 198 is disposed 90° from the head end 204 of the second slot 202.

The fasteners of the third embodiment are identical to the fasteners 62 and 64 of the first embodiment. Each set of fasteners has two fasteners which attach the respective ratchet wheel 164 to the spool sleeve 162. A first one of the two fasteners has a shank secured within the first hole 178, with a portion projecting from the end face 176 and located within the head end 200 of the first slot 198. The portion of the shank which is located within the head end 200 has a diametrical width equal to W3 (see FIG. 2), which is slightly less than the width W2 of the head end 200 (FIG. 12) and which is slightly greater than the width W1 of the majority of the first slot 198.

A head of the first fastener abuts a surface of the ratchet wheel 164 presented away from the spool sleeve 162. The head has a width which is greater than the widths W1 and W2 so that the head retains the ratchet wheel 164 in abutment with the spool sleeve 162 and prevents axial movement of the ratchet wheel 164 away from the spool sleeve 162. The head presses the ratchet wheel 164 against the end face 176 of the spool sleeve 162 only with a force sufficient to prevent axial play (i.e., the fastener is not overly tightened).

In a similar manner, the second of the two fasteners is secured within the second hole 186 and a portion projects from the end face 176 and into the head end 204 of the second slot 202. The portion of the shank which is located in the head end 204 has a diametrical width which is equal to W3, which is slightly less than the width W2 of the head end 204 and slightly greater than the width W1 of the majority of the second slot 202. The head of the second fastener has a width which is greater than the widths W1 and W2 such that the second fastener also retains the ratchet wheel 164 in axial abutment with the spool sleeve 162, but only with a force sufficient to prevent axial play. Preferably, the fasteners are metal screws which have a hardness of preferably $R_c$=44–50.

When a vehicle occupant is seated in a vehicle, the webbing is withdrawn from the retractor of the third embodiment and secured across the vehicle occupant. Upon the occurrence of a vehicle collision (e.g., a change in vehicle velocity above a predetermined amount), the blocking mechanism of the third embodiment is activated in a manner similar to that for the first embodiment. As a result, the ratchet wheels 164 are prevented from rotating and the vehicle occupant is restrained.

As the vehicle occupant continues to move forward, the occupant presses against the webbing and the tension force applied to and by the webbing increases. This tension force is transmitted to the spool sleeve 162. The portions of the fasteners within the head ends 200 and 204 press against the tapering surfaces between the width W2 and the width W1 of the respective slots 198 and 202. If the force with which the fasteners press is below a predetermined amount, the fasteners, and thus the spool sleeve 162, do not move relative to the block ratchet wheels 164.

However, if the force applied by the webbing to the spool sleeve 162 is sufficiently large, the fasteners will begin to move relative to the blocked ratchet wheels 164 along the respective slots 198 and 202. The material of the ratchet wheels 164 adjacent to the slots 198 and 202 deforms and yields. The fasteners expand the width of the respective slots 198 and 202 to permit passage of the shanks along the respective slots. The work done by the fasteners in deforming the ratchet wheel material dissipates or absorbs the energy from the tensioned webbing.

The deformation which occurs in the ratchet wheels 164 may be of various types, and may include radial displacement of the ratchet wheel material, a curling of the ratchet wheel material outwardly from the original plane of the ratchet wheel and/or cutting of the ratchet wheel material away from the ratchet wheel.

As the fasteners travel around their respective slots 198 and 202, the spool sleeve 162 is permitted to move relative to the blocked ratchet wheels 164 a distance which is substantially equal to a rotation of 270°. Thus, a predetermined amount of the webbing is permitted to be unwound from the spool sleeve 162 under the tension applied by the webbing, and the vehicle occupant is permitted to move forward a predetermined amount. Accordingly, similar to the above described embodiments, total energy is dissipated over a longer period of time and peak forces are reduced. More crash energy is dissipated by the retractor, and the amount of force transferred through the webbing to the vehicle occupant is reduced.

Parts of a fourth embodiment of the present invention are shown in FIGS. 13–16. The fourth embodiment is similar to the second embodiment (FIGS. 6–10) in that a seat belt webbing, a frame, a drive assembly and a blocking mechanism of the fourth embodiment are identical to those of the second embodiment. Accordingly, it is to be understood that the structure and function of these parts are as described for the second embodiment. Only the spool assembly of the fourth embodiment differs from the spool assembly 100 of the second embodiment.

Figure 16:
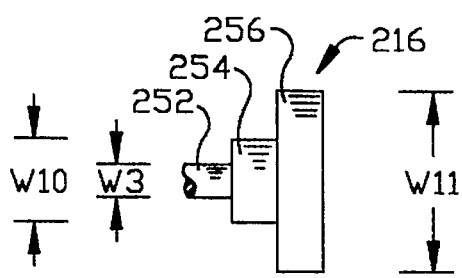
FIG. 16 is a view of a partially broken away part of the retractor comprising the fourth embodiment.

The spool assembly of the fourth embodiment has a spool sleeve and shaft which are identical to the spool sleeve 102 and shaft 109 of the second embodiment. The spool assembly of the fourth embodiment has two metal ratchet wheels 212 (FIG. 13, only one shown), two piggyback members 214 (FIG. 14, only one shown) and associated specialized fasteners 216 (FIG. 16, only one shown). The two ratchet wheels 212 are in engagement with opposite axial ends of the spool sleeve.

The ratchet wheels 212 have identical structural features, when viewed axially toward the spool sleeve, and only one ratchet wheel 212 and its attachment mechanism are described below with the understanding that the same structural features and attachment mechanism are present for the other ratchet wheel 212. Preferably, the ratchet wheel 212 is made of metal and has a hardness of $R_c$=36–42. The ratchet wheel 212 (FIG. 13) has an annular array of teeth 220 extending around its periphery. The shaft extends through a generally D-shaped center hole 222 of the ratchet wheel 212 along an axis 226.

A first arcuate slot 224 extends through the ratchet wheel 212 and approximately 270° about the axis 226. The first slot 224 has a center arc median line M9 located between concentric, arcuate inner and outer edges of the first slot 224 and extending along the length of the first slot 224. The median line M9 is located at a radial distance R1 from the axis 226. The radial distance R1 is the same as the radial distance R1 previously described with respect to the second embodiment. The first slot 224 overlaps a first hole on the spool sleeve.

The first slot 224 has a width W2 between its inner and outer edges as measured along a radius from the axis 226. The width W2 is the same as the width W2 previously described. The width of the first slot 224 is substantially constant along the entire length of the first slot 224.

A second slot 228 extends through the ratchet wheel 212 and approximately 270° about the axis 226. A center arc median line M10 of the second slot 228 is located between concentric, arcuate inner and outer edges of the second slot. The median line M10 is located at a radial distance R2 from the axis 226 as measured along a radius from the axis 226. The distance R2 is the same as the distance R2 previously described with respect to the second embodiment. The second slot 228 overlaps a second hole on the spool sleeve.

The second slot 228 is concentric with and radially closer to the axis 226 than the first slot 224. The second slot 228 has a width which is the same as the width W2 of the first slot 224. The second slot 228 is angularly offset from the first slot 224 by approximately 180°.

The piggyback members 214 (FIG. 14) are made of an appropriate material, preferably plastic. The piggyback members 214 are identical and only one piggyback member is described with the understanding that the other piggyback member has identical structure. The piggyback member 214 has a first arcuate slot 232 which extends through the piggyback member 214 and around the axis 226. The first slot 232 has a center arc median line M11 which is located between concentric, arcuate inner and outer edges of the first slot 232 and which extends along the length of the first slot 232. The median line M11 is located at the same radial distance R1 from the axis 226 as the median line M9 (FIG. 13) of the first slot 224 of the ratchet wheel 212. The first slot 232 (FIG. 14) has a width W8, measured between its inner and outer edges along a radial line. The width W8 is greater than the width W2 of the first slot 224.

A first circular hole 234 extends through the piggyback member 214 and is located adjacent to one end of the first slot 232. The first hole 234 has a diametrical width W9. A center of the first hole 234 is aligned with the median line M11 of the first slot 232 and is located at the radial distance R1 from the axis 226. A thin web of material 236 is located between the first hole 234 and the first slot 232. In general, the combined arc length of the first slot 232, the web of material 236 and the first hole 234 extends approximately 270° about the axis 226. The first slot 232 and the first hole 234 of the piggyback member 214 overlap the first slot 224 of the ratchet wheel 212.

A second arcuate slot 238 extends through the piggyback member 214 and around the axis 226. A center arc median line M12 of the second slot 238 is located between the concentric, arcuate inner and outer edges of the second slot 238 and extends along the length of the second slot 238. The median line M12 is located at the same radial distance R2 from the axis 226 as the median line M10 (FIG. 13) of the second slot 228 of the ratchet wheel 212. The second slot 238 (FIG. 14) of the piggyback member 214 has a width between its inner and outer edges which is equal to the width W8 of the first slot 232.

A second circular hole 240 extends through the piggyback member 214 and is located adjacent to one end of the second slot 238. The second hole 240 has a diametrical width which is the same as the diametrical width W9 of the first hole 234. A center of the second hole 240 is aligned with the median line M12 of the second slot 238 and located at the radial distance R2 from the axis 226. A thin web of material 242 is located between the second hole 240 and the second slot 238.

The combined arc length of the second slot 238, the web of material 242 and the second hole 240 is approximately 270°. Further, the second slot 238, the web of material 242 and the second hole 240 are angularly offset relative to the first slot 232, the web of material 236 and the first hole 234, respectively, by approximately 180°. The second slot 238 and the second hole 240 of the piggyback member 214 overlap the second slot 228 of the ratchet wheel 212.

The piggyback member 214 is mounted on the ratchet wheel 212 by three fasteners (not shown). The fasteners may be of any suitable type, such as rivets or screws. Each fastener extends through a respective mount hole 246 in the ratchet wheel 212 and a respective mount hole 248 in a piggyback member 214. The mounting of the piggyback member 214 to the ratchet wheel 212 is similar to the mounting of the piggyback member 120 (FIG. 6) to the ratchet wheel 110 of the second embodiment. Thus, similar to the second embodiment, the ratchet wheel 212 (FIG. 15) and its attached piggyback member 214 rotate together and can be considered to be a unit and referred to as a ratchet wheel.

Two fasteners 216 (FIG. 16, only one shown) are associated with each ratchet wheel 212 and piggyback member 214. The two fasteners 216 are identical and only one of the fasteners is described with the understanding that the other fastener has identical structure. Preferably, the fastener 216 is metal. The first fastener 216 has a shank 252 which has a diametrical width W3. The width W3 is the same as the width W3 for the fasteners described with respect to the previous embodiments.

The first fastener 216 has an annular shoulder 254 adjacent to the shank 252. The annular shoulder 254 has a diametrical width W10 which is greater than the width W3. Also, the first fastener 216 has a head 256 at its terminal end. The head 256 has a diametrical width W11 which is greater than the width W10. The shank 252 of the first fastener 216 is secured in the first hole of the spool sleeve, with a portion extending through the first slot 224 of the ratchet wheel 212. The width W3 is less than the width W2 such that clearance is provided for the shank 252 within the first slot 224.

The annular shoulder 254 is located within the first hole 234 of the piggyback member 214. The width W10 is slightly less than the width W9 of the first hole 234. Thus, a slight clearance exists for the annular shoulder 254 within the first hole 234. However, the width W10 is greater than the width W8 of the first slot 232.

The head 256 abuts against the outer face of the piggyback member 214 distal from the ratchet wheel 212. The width W11 of the head 256 is greater than the width W9 of the first hole 234 and the width W8 of the first slot 232 such that the head 256 of the fastener 216 presses against the piggyback member 214. However, the pressing force is only sufficient to prevent axial play (i.e., the first fastener 216 is not overly tightened).

Similarly, the second of the two fasteners 216 is secured in the second hole of the spool sleeve. The second fastener 216 extends through the second slot 228 of the ratchet wheel 212 and the second hole 240 of the piggyback member 214, with the shank 252 being located within the second slot 228 and the annular shoulder 254 being located within the second hole 240. The head 256 abuts against the outer face of the piggyback member 214 with a pressing force sufficient to prevent axial play.

When a vehicle occupant is seated in a vehicle, the webbing is withdrawn from the retractor of the fourth embodiment and secured across the vehicle occupant. Upon the occurrence of a vehicle collision (e.g., a change in vehicle velocity above a predetermined amount), the blocking mechanism of the fourth embodiment is activated in a manner similar to that for the second embodiment. As a result, the ratchet wheels 212 are prevented from rotating and the vehicle occupant is restrained.

As the vehicle occupant continues to move forward, the occupant presses against the webbing and the tension force applied to and by the webbing increases. This tension force is transmitted to the spool sleeve. The annular shoulders 254 of the fasteners 216 bear against the respective webs of material 236 and 242. If the bearing force is below a predetermined amount, the webs of material 236 and 242 remain intact and the fasteners 216 remain rotationally stationary relative to the ratchet wheels 212 and the piggyback members 214. Thus, the spool sleeve is held stationary. Further withdrawal of the webbing is prevented and the vehicle occupant is restrained by the webbing.

Upon the occurrence of a vehicle deceleration sufficient to cause the predetermined amount of tension force in the webbing, the spool sleeve tends to rotate relative to the blocked ratchet wheels 212. The shoulders 254 of the fasteners 216 bear upon the respective webs of material 236 and 242 with sufficient force to rupture the webs of material 236 and 242. The fasteners 216 are guided to move along the respective first and second slots 224 and 228 of the ratchet wheels 212. However, the material of the piggyback members 214 adjacent to the first and second slots 232 and 238 cause a resistance to the movement of the fasteners 216.

Specifically, because the piggyback members 214 are fixed to the ratchet wheels 212, the fasteners 216 must deform the material of the piggyback members 214 along the respective slots 232 and 238. As the shoulders 254 of the fasteners 216 move along their respective slots 232 and 238, the material of the piggyback member 214 deforms or yields. The deformation may include radial movement of the material, axial curling of the material away from the original plane of the piggyback member 214, and/or shearing of the material.

The spool sleeve is permitted to rotate relative to the blocked ratchet wheels 212 a distance which is substantially equal to a rotation of 270° as the fasteners 216 are guided along their respective slots 224 and 228 of the ratchet wheels 212. The deformation of the material of the piggyback members 214 dissipates or absorbs kinetic energy which would otherwise be transferred to the vehicle occupant by the webbing as described above with respect to the previous embodiments. Thus, the maximum tension force which is perceived by the vehicle occupant in the webbing is reduced.

Figure 17:
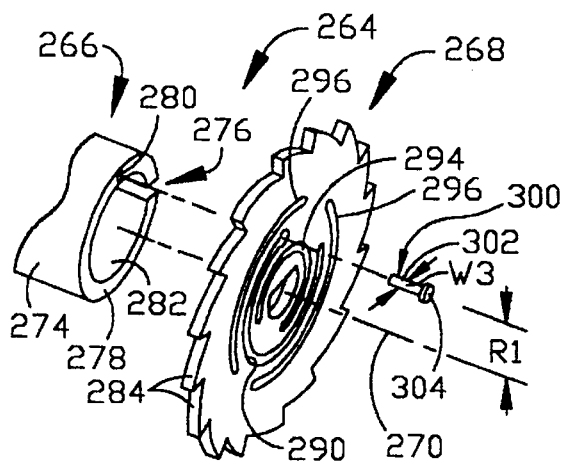
FIG. 17 is an exploded perspective view, partially broken away, of a portion of a retractor comprising a fifth embodiment of the present invention.
Figure 18:
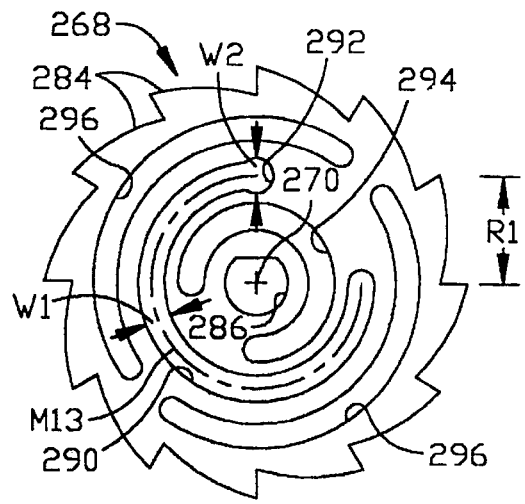
FIG. 18 is an end view of a part of the retractor comprising the fifth embodiment.

Parts of a fifth embodiment of the present invention are shown in FIGS. 17 and 18. The fifth embodiment is similar to the first embodiment in that a seat belt webbing, a frame, a drive assembly and a blocking mechanism of the fifth embodiment are identical to those of the first embodiment. These parts are not illustrated, but it is to be understood that the structure and function of these parts are as described for the first embodiment. Only a spool assembly 264 (FIG. 17) of the fifth embodiment differs from the spool assembly 14 of the first embodiment.

The spool assembly 264 has a spool sleeve 266, two ratchet wheels 268 (only one shown), a shaft (not shown) and two fasteners 300 (only one shown), which are all preferably metal. The shaft is identical to the shaft 20 (FIG. 2) of the first embodiment. The spool sleeve 266 (FIG. 17) is elongate and extends along an axis 270 about the shaft. The spool sleeve 266 has a generally cylindrical outer surface 274, which is discontinuous at a slot 276 extending into the hollow interior of the spool sleeve and along the length of the spool sleeve 266.

An end of the webbing (not shown in FIG. 17) extends radially through the slot 276 in the spool sleeve 266 and is sewn into a loop about the shaft (not shown). The portion of the webbing extending from the slots 276 is wound about the spool sleeve 266 for storage.

At each end of the spool sleeve 266 is a generally C-shaped axial end face 278 (only one shown in FIG. 17). The structural features at each end face 278 are identical in kind but are mirror images of those at the other end face 278. Accordingly, only the structure at one end face 278 is discussed. A hole 280 extends parallel to the axis 270 into the material of the spool sleeve 266 from the end face 278. The hole 280 extends into the spool sleeve 266 between the outer surface 274 and an inner surface 282 and has a center located at a first radial distance R1 from the axis 270. The distance R1 is same as the distance R1 previously described with respect to the first embodiment.

The two ratchet wheels 268 are in engagement with the opposite end faces 278 of the spool sleeve 266. Each ratchet wheel 268 has identical structural features, when viewed axially toward the spool sleeve 266. Thus, only one ratchet wheel 268 and its attachment mechanism are described below with the understanding that the same structural features and attachment mechanism are present for the other ratchet wheel 268.

The ratchet wheel 268 (FIG. 18) preferably has a hardness of $R_c$=36–42. The rachet wheel 268 is disk like and has an annular array of teeth 284 located about its outer periphery. Each tooth 284 has a radially extending abutment face and an intersecting sloped face. The shaft (not shown) extends through a generally D-shaped center hole 286 in the ratchet wheel on the axis 270 and the ratchet wheel is fixed for rotation with the shaft.

An arcuate slot 290 extends through the ratchet wheel 268 and extends approximately 270° about the axis 270. The slot 290 has a center arc median line M13 located between concentric, arcuate inner and outer edges of the slot 290 and extending along the length of the slot 290. The median line M13 is located at the same radial distance R1 from the axis 270 as the center of the hole 280 of the spool sleeve 266. Accordingly, the slot 290 overlaps the hole 280. The slot 290 has a width W1 between its inner and outer edges, as measured along the radius from the axis 270, for a majority of the length of the slot 290. At one end, the slot 290 has an enlarged rounded head end 292. The head end 292 has a width W2 which is slightly larger than the width W1. The widths W1 and W2 of this fifth embodiment are the same as the widths W1 and W2 of the previously described with respect to the first embodiment.

An inner expansion slot 294 extends through the ratchet wheel 268 and extends approximately 270° about the axis 270. The inner expansion slot 294 is concentric with and radially closer to the axis 270 than the slot 290. The inner expansion slot 294 is located radially between the slot 290 and the center hole 286. Also, the inner extension slots 294 is angularly offset from the slot 290 by approximately 180°.

Two arcuate outer expansion slots 296 extend through the ratchet wheel 268. Each outer expansion slot 296 extends approximately 160° about the axis 270. The two outer expansion slots 296 are at the same radial distance from the axis 270 such that the outer expansion slots 296 form a discontinuous circle about the axis 270. The outer expansion slots 296 are located concentric with and radially outward of the slot 290.

One of the fasteners 300 (FIG. 17) attaches the ratchet wheel 268 to the spool sleeve 266 at the adjacent end face 278. The fastener 300 associated the ratchet wheel 268 is identical to the fastener 62 associated with the ratchet wheel 48 of the first embodiment. The fastener 300 has a shank 302 secured within the hole 280, with a portion projecting from the end face 278 and located within the head end 292 of the slot 290. The portion of the shank 302 which is located within the head end 292 has a diametrical width W3, which is slightly less than the width W2 of the head end 292 and which is slightly greater than the width W1 of the majority of the slot 290. The width W3 is the same as the width W3 previously described with respect to the first embodiment.

A head 304 of the fastener 300 abuts a surface of the ratchet wheel 268 presented away from the spool sleeve 266. The head 304 has a width which is greater than the widths W1 and W2 so that the head 304 retains the ratchet wheel 268 in abutment with the spool sleeve 266 and prevents axial movement of the ratchet wheel 268 away from the spool sleeve 266. The head 304 pressed the ratchet wheel 268 against the end face 278 of the spool sleeve 266 only with a force sufficient to prevent axial play (i.e., the fastener 300 is not overly tightened). Preferably, the fastener is a metal screw with a hardness of $R_c$=44–50.

When a vehicle occupant is seated in a vehicle, the webbing is withdrawn from the retractor of the fifth embodiment and secured across the vehicle occupant. Upon the occurrence of a vehicle collision (e.g., a change in vehicle velocity above a predetermined amount), the blocking mechanism of the fifth embodiment is activated in a manner similar to that of the first embodiment. As a result, the ratchet wheels 268 are prevented from rotating and the vehicle occupant is restrained.

As the vehicle occupant continues to move forward, the occupant presses against the webbing and the tension force applied to and by the webbing increases. This tension force is transmitted to the spool sleeve 266. The portions of the shanks 302 of the fasteners 300 within the head ends 292 press against the tapering surfaces between the width W2 and the width W1 of the respective slots 290. If the force with which the fasteners 300 press is below a predetermined amount, the fasteners and thus the spool sleeve 266 do not move relative to the blocked ratchet wheels 268.

However, if the force applied by the webbing to the spool sleeve 266 is sufficiently large, the fasteners will be begin to move relative to the blocked ratchet wheels 268 along the respective slots 290. The material of the ratchet wheels 268 adjacent to the slots 290 deforms and yields. For each ratchet wheel 268, the material of the ratchet wheel is moved radially inward and outward such that the width of the slot 290 is increased to permit passage of the shanks 302 through the slot 290. The material which is displaced radially is displaced into either the inner expansion slot 294 or one of the outer expansion slots 296.

The spool sleeve 266 is permitted to rotate relative to the blocked ratchet wheels 268 a distance which is substantially equal to a rotation of 270° as the fasteners 300 are guided along the respective slots 290 of the ratchet wheels 268. The deformation of the material of the ratchet wheels 268 dissipates or absorbs kinetic energy which would otherwise be transferred to the vehicle occupant by the webbing as described above with respect to the previous embodiments. Thus, the maximum tension force which is perceived by the vehicle occupant in the webbing is reduced.

Figure 19:
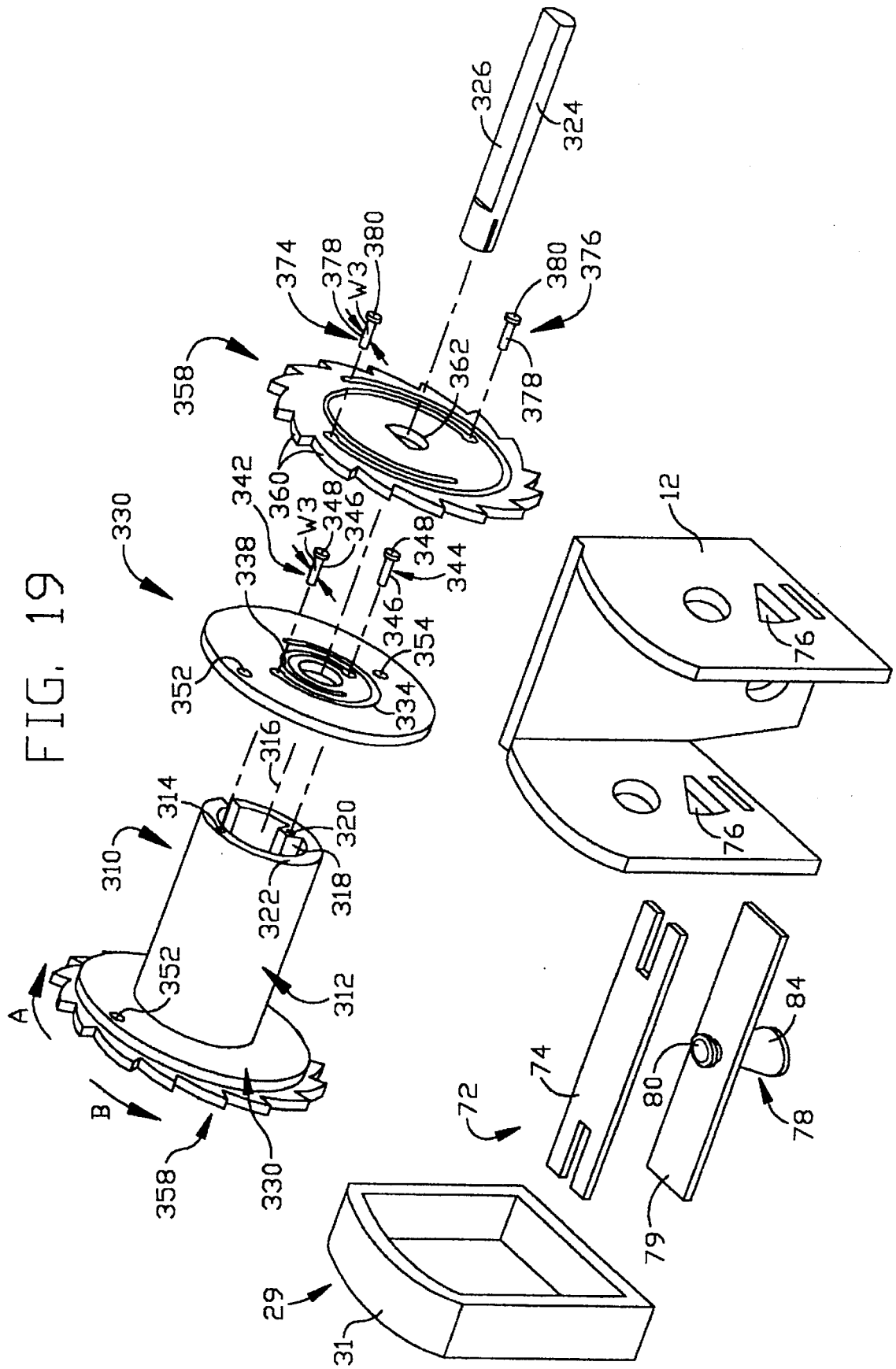
FIG. 19 is an exploded perspective view of a retractor comprising a sixth embodiment of the present invention.

A sixth embodiment of the present invention is shown in FIG. 19. The sixth embodiment is similar to the first embodiment in that a seat belt webbing, a frame, a drive assembly and a blocking mechanism of the sixth embodiment are identical to those of the first embodiment. Accordingly, these parts are discussed below with reference numbers identical to those used for the first embodiment and with the understanding that the structure and function of these parts are as described for the first embodiment. Only a spool assembly 310 of the sixth embodiment differs from the spool assembly 14 of the first embodiment (FIG. 1).

The spool assembly 310 (FIG.19) stores a length of webbing (not shown) and is rotatable in a webbing retraction direction A and a webbing withdrawal direction B. The spool assembly 310 includes a spool sleeve 312 which is identical to the spool sleeve 34 of the first embodiment. The spool sleeve 312 has a first hole 314 which extends from an end face 322 into the material of the spool sleeve 312 in a direction parallel to a longitudinal axis 316. The center of the first hole 314 is located at a first radial distance R1 from the axis 316. The distance R1 is the same as the distance R1 as described with reference to the first embodiment.

An internal ridge 318 extends along the inner face of the spool sleeve 312 in a direction parallel to the axis 316. A second hole 320 extends into the material of the internal ridge 318 of the spool sleeve 312 in a direction parallel to the axis 316. A center of the second hole 320 is located at a radial distance R2 from the axis 316. The radial distance R2 is the same as the radial distance R2 as discussed with respect to the first embodiment, accordingly, the radial distance R2 is less than the radial distance R1.

A shaft 324 of the spool assembly 310 is identical to the shaft 20 of the first embodiment. The shaft 324 extend through the hollow interior of the spool sleeve 312 such that the spool sleeve 312 is concentric about the shaft. The shaft 324 has a portion which is D-shaped to have a flat 326.

Figure 20:
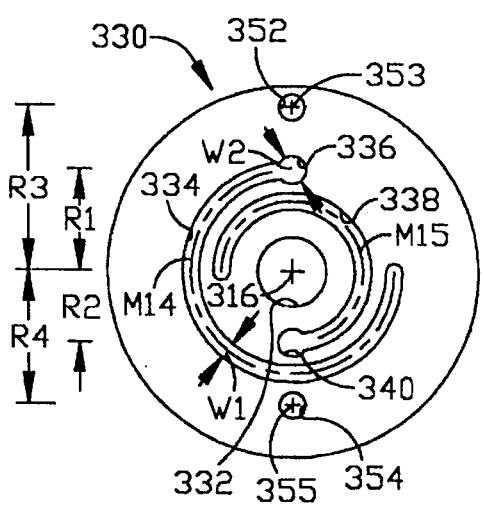
FIG. 20 is an end view of a part of the retractor of FIG. 19.

Two disk shaped wheels 330 are in engagement with the opposite axial end faces 322 of the spool sleeve 312. The wheels 330 have identical structural features and only one wheel 330 is described. Preferably, the wheel 330 (FIG. 20) is metal with a hardness of $R_c=36–42$. The wheel 330 has a circular center hole 332 through which the shaft 324 extends. The wheel 330 is freely rotatable relative to the shaft 324.

A first arcuate slot 334 extends through the wheel 330 and extends approximately 270° about the axis 316. The first slot 334 has a center arc median line M14 located between concentric, arcuate inner and outer edges of the first slot 334 and extending along the length of the first slot 334. The median line M14 is located at the same radial distance R1 from the axis 316 as the center of the first hole 314 (FIG. 19) of the spool sleeve 312. Thus, the first slot 334 overlaps the first hole 314.

The first slot 334 (FIG. 20) has a width W1 between its inner and outer edges, as measured along a radius from the axis 316, for a majority of the length of the first slot 334. At one end, the first slot 334 has an enlarged rounded head end 336. The head end 336 has a width W2 which is slightly larger than the width W1. The widths W1 and W2 are same as the widths W1 and W2 described with respect to the first embodiment.

A second arcuate slot 338 extends through the wheel 330 and extends approximately 270° about the axis 316. A center arc median line M15 of the second slot 338 is located between concentric, arcuate inner and outer edges of the second slot. The median line M15 is at the same radial distance R2 from the axis 316 as the second hole 320 (FIG. 19) of the spool sleeve 312. Thus, the second slot 338 overlaps the second hole 320, and is concentric with and radially closer to the axis 316 than the first slot 334.

The second slot 338 (FIG. 20) has a width W1, as measured between its inner and outer edges along a radial line, for a majority of its length which is the same as the width W1 of the first slot 334. At one end, the second slot 338 has an enlarged rounded head end 340. The head end 340 has a width which is the same as the width W2 of the head end 336. Thus, the width W2 of the head end 340 is larger than the width W1 of the majority of the length of the second slot 338. The second slot 338 is angularly offset from the first slot 334 by approximately 180°.

First and second fasteners 342 and 344 (FIG. 19) attach the wheel 330 to the spool sleeve 312 at the adjacent end face 322. The first and second fasteners 342 and 344 may be any suitable fastener, such as metal screws. The material of the fasteners has a hardness of preferably $R_c=44–50$. The first and second fasteners 342 and 344 are identical and only the first fastener 342 is described in detail, with the understanding that the description applies to the second fastener 344. The first fastener 342 has a shank 346 which is threaded at a tip portion. The shank 346 is in threaded engagement with the material of the spool sleeve 312 at the first hole 314 such that the first fastener 342 is prevented from moving relative to the spool sleeve 312.

A portion of the shank 346 projects from the end face 322 of the spool sleeve 312, and is located in the head end 336 of the first slot 334 of the wheel 330. The portion of the shank 346 which is located within the head end 336 has a diametrical width W3 which is slightly less than the width W2 of the head end 336 and which is slightly greater than the width W1 of the majority of the first slot 334.

A head 348 of the first fastener 342 abuts a surface of the wheel 330 presented away from the spool sleeve 312. The head 348 has a diametrical width which is greater than the width W1 and W2 so that the head 348 retains the wheel 330 in abutment with the spool sleeve 312 and prevents axial movement of the wheel 330 away from the spool sleeve 312. The head 348 presses the wheel 330 against the end face 322 of the spool sleeve 312 only with a force sufficient to prevent axial play (i.e., the first fastener 342 is not overly tightened). In a similar manner, the second fastener 344 is affixed within the second hole 320 and extends through the head end 340 of the second slot 338.

Preferably, the first and second fasteners 342 and 344 are screws, however, the first and second fasteners 342 and 344 may be formed in one piece with the spool sleeve 312. Also, the first and second fasteners 342 and 344 could be fluted or knurled and press-fit into the holes 314 and 320.

A first hole 352 (FIG. 20) extends through the wheel 330 and has a center 353 located at a distance R3 from the axis 316. The first hole 352 is located radially outward of the head end 336 of the first slot 334. A second hole 354 extends though the wheel 330 and has a center 355 located at a distance of R4 from the axis 316. The second hole 354 is located radially outward of the head end 340 of the second slot 338. The holes 352 and 354 are spaced 180° from each other.

Two metal ratchet wheels 358 (FIG. 19, only one shown) are in engagement with the faces of the wheels 330 which are distal from the spool sleeve 312. The ratchet wheels 358 have identical structural features and only one ratchet wheel 358 is described. The ratchet wheel 358 has an annular array of teeth 360 extending around its periphery. The shaft 324 extends through a generally D-shaped center hole 362 of the ratchet wheel 358. The ratchet wheel 358 is rotationally fixed to the shaft 324.

Figure 21:
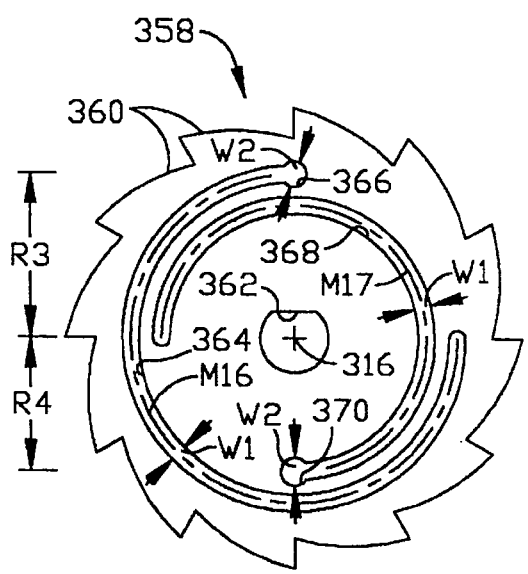
FIG. 21 is an end view of another part of the retractor of FIG. 19.

Preferably, the ratchet wheel 358 is metal, with a hardness of $R_c$=36–42. A first arcuate slot 364 (FIG. 21) extends through the ratchet wheel 358 and extends approximately 270° about the axis 316. The first slot 364 has a center arc median line M16 located between concentric, arcuate inner and outer edges of the first slot 364 and extending along the length of the first slot 364. The median line M16 is located at the same radial distance R3 from the axis 316 as the center 353 of the first hole 352 of the wheel 330. Thus, the first slot 364 overlaps the first hole 352.

The first slot 364 has a width W1 between its inner and outer edges, as measured along a radius from the axis 316. The width W1 is substantially constant along a majority of the length of the first slot 364. At one end, the first slot 364 has an enlarged rounded head end 366. The head end 366 has a width W2 which is slightly larger than the width W1. The widths W1 and W2 are the same as the widths W1 and W2 described with respect to the slots of the first embodiment.

A second arcuate slot 368 extends through the ratchet wheel 358 and extends approximately 270° about the axis 316. The second slot 368 has a center arc median line M17 located between concentric, arcuate inner and outer edges of the second slot 368 and extending along the length of the second slot 368. The median line M17 is located at the same radial distance R4 from the axis 316 as the center 355 of the second hole 354 of the wheel 330. Thus, the second slot 368 overlaps the second hole 354 and is concentric with and radially closer to the axis 316 than the first slot 364.

The second slot 368 has a width W1 between its inner and outer edges, measured along a radius from the axis 316 for the majority of the length of the second slot 368. This width W1 is the same as the width W1 of the first slot 364. At one end, the second slot 368 has an enlarged rounded head end 370. The head end 370 has a width W2 which is the same as the width W2 of the head end 366. Thus, the width W2 of the head end 370 is slightly larger than the width W1 of the majority of the second slot 368. The second slot 368 is angularly offset from the first slot 364 such that the head end 370 of the second slot is disposed 180° from the head end 366 of the first slot 364.

First and second fasteners 374 and 376 (FIG. 19) attach the ratchet wheel 358 to the wheel 330. The first and second fasteners 374 and 376 may be any suitable fastener, such as metal screws. The material of the fasteners has a hardness of preferably $R_c$=44–50. The first and second fasteners 374 and 376 are identical and only the first fastener 374 is described in detail with the understanding that the description applies to the second fastener 376. The first fastener has a shank 378 which is threaded at a tip portion. The shank 378 is in threaded engagement with the material of the wheel 330 at the first hole 352 such that the first fastener 374 is prevented from moving relative to the wheel 330.

A portion of the shank 378 projects from the wheel 330 and is located in the head end 366 (FIG. 21) of the first slot 364 of the ratchet wheel 358. The portion of the shank 378 which is located within the head end 366 has a diametrical width W3 (FIG. 19) which is slightly less than the width W2 of the head end 366 and which is slightly greater than the width W1 of the majority of the first slot 364.

A head 380 of the first fastener 374 abuts a surface of the ratchet wheel 358 presented away from the wheel 330. The head 380 has a diametrical width which is greater than the widths W1 and W2 so that the head 380 retains the ratchet wheel 358 in abutment with the wheel 330 and prevents axial movement of the ratchet wheel 358 away from the wheel 330. The head 380 presses the ratchet wheel 358 against the wheel 330 only with a force sufficient to prevent axial play (i.e., the first fastener is not overly tightened). In a similar manner, the second fastener 376 (FIG.19) is secured within the second hole 354 of the wheel 330 and extends into the head end 370 of the second slot 368 of the ratchet wheel 358.

When a vehicle occupant seated in a vehicle, the webbing is withdrawn from the retractor of the sixth embodiment and secured across the vehicle occupant. The ratchet wheel 358 and the wheel 330 normally rotate together and can be considered to be a unit and referred to as a ratchet wheel.

Upon the occurrence of a vehicle collision (e.g., a change in vehicle velocity above a predetermined amount), the pendulum 78 tips and the head 80 pushes the lock bar 74 upward. The lock bar 74 engages a tooth 360 of each ratchet wheel 358. Thus, the ratchet wheels 358 are prevented from rotating in the webbing withdrawal direction B and the vehicle occupant is restrained.

As the vehicle occupant continues to move forward, the occupant presses against the webbing, and the tension force supplied to and by the webbing increases. This tension force is transmitted to the spool sleeve 312. The spool sleeve 312 will thus have a force applied to it which tends to rotate the spool sleeve 312 in the webbing withdrawal direction B relative to the blocked ratchet wheels 358.

The shanks 346 of the first and second fasteners 342 and 344 which are affixed to the spool sleeve 312, press against the tapering surface between the width W2 and the width W1 of the respective slots 334 and 338 on the wheels 330. Also, the shanks 378 of the first and second fasteners 374 and 376, which are affixed to the wheels 330, press against the tapering surface between the width W2 and the width W1 of the respective slots 364 and 368 of the ratchet wheels 358.

If the force with which the first and second fasteners 342 and 344 press is below a predetermined amount, the first and second fasteners 342 and 344, and thus the spool sleeve 312 do not move relative to the wheels 330. Also, if the force with which the first and second fasteners 374 and 376 press is below a predetermined amount, the first and second fasteners 374 and 376, and thus the wheels 330 and the spool sleeve 312, do not move relative to the blocked ratchet wheels 358.

However, if the force is sufficiently large, the first and second fasteners 342 and 344 will begin to move relative to the wheels 330 along the respective slots 334 and 338. Specifically, the outer surfaces of the shanks 346 of the fasteners 342 and 344 bear upon the surfaces of the respective slots 334 and 338, and the material of the wheels 330 adjacent to the slots 334 and 338 deforms and yields.

Similarly, if the force applied by the first and second fasteners 374 and 376 is sufficiently large, the first and second fasteners 374 and 376 will begin to move relative to the blocked ratchet wheels 358 along the respective slots 364 and 368. Specifically, the outer surfaces of the shanks 378 of the fasteners 374 and 376 bear upon the surfaces of the respective slots 364 and 368, and the material of the ratchet wheels 358 adjacent to the slots 364 and 368 deforms and yields.

As the first and second fasteners 342 and 344 travel around their respective slots 334 and 338, the spool sleeve 312 is permitted to rotate relative to the wheels 330 approximately 270°. Also, as the first and second fasteners 374 and 376 travel around their respective slots 364 and 368, the wheels 330 and the spool sleeve 312 are permitted to rotate relative to the blocked ratchet wheels 358 approximately 270°. Thus, the spool sleeve 312 is permitted to rotate a total of 540° relative to the blocked ratchet wheels 358. Accordingly, a predetermined amount of webbing is permitted to be unwound from the spool sleeve 312 under the tension force applied by the webbing, and the vehicle occupant is permitted to move forward a predetermined amount.

The deformation of the material of the wheels 330 and the deformation of the material of the ratchet wheels 358 dissipates or absorbs kinetic energy which would otherwise be transferred to the vehicle occupant by the webbing as described above with respect to the previous embodiments. Thus, the maximum tension force which is perceived by the vehicle occupant in the webbing is reduced.

The material characteristic of the wheels 330 and the ratchet wheels 358 may be chosen such that deformation of either the wheels 330 or the ratchet wheels 358 occurs before the deformation of the other. Alternatively, the deformation of the wheels 330 may occur simultaneously with the deformation of the ratchet wheels 358. Preferably, the deformation of the wheels 330 occurs prior to the deformation of the ratchet wheels 358. The deformation of the wheels 330 occurs due to a force which is lesser than the force required to cause deformation of the ratchet wheels 358. Thus, two levels of energy absorption are present.

From the above description of the invention, those skilled in the art will perceive improvements, changes and modifications. Such improvements, changes and modifications within the skill of the art are intended to be covered by the appended claims.

Having described the invention, the following is claimed:

1. A seat belt webbing retractor comprising:
   a spool around which seat belt webbing is wound, said spool being supported for rotation in webbing withdrawal and webbing retraction directions;
   a ratchet wheel rotatable with said spool in the webbing withdrawal and webbing retraction directions;
   blocking means for preventing rotation of said ratchet wheel and said spool in the webbing withdrawal direction; and
   means for dissipating energy and for permitting said spool to rotate in the webbing withdrawal direction relative to said ratchet wheel in response to a webbing withdrawal force above a predetermined amount when said ratchet wheel is prevented from rotating by said blocking means, said energy dissipating means including a portion of said spool which deforms a portion of said ratchet wheel.

2. A retractor as set forth in claim 1, wherein said portion of said ratchet wheel deformed by said portion of said spool includes a slotted segment.

3. A retractor as set forth in claim 2, wherein said portion of said ratchet wheel deformed by said portion of said spool includes first and second slotted segments extending about a rotational axis of said ratchet wheel, said first slotted segment being located radially outward of said second slotted segment, said portion of said spool which deforms said portion of said ratchet wheel includes first and second projections extending into said first and second slotted segments, respectively, said spool has a general spiral shape, said second projection being located at a radially inner portion of said spiral spool and said first projection being located at a radially outer portion of said spiral spool.

4. A retractor as set forth in claim 2, wherein said slotted segment extends in an arc.

5. A retractor as set forth in claim 2, wherein said spool is hollow and has a general cylindrical shape, said spool has an internal projection extending parallel to a rotation axis of said spool and projecting toward the axis, said portion of said spool which deforms a portion of said ratchet wheel includes a part extending from said internal projection.

6. A retractor as set forth in claim 2, wherein said portion of said spool which deforms said slotted segment includes a projection which extends into said slotted segment.

7. A retractor as set forth in claim 6, wherein said ratchet wheel includes a metal wheel, said slotted segment comprising a portion of said metal wheel.

8. A retractor as set forth in claim 6, wherein said ratchet wheel includes a metal wheel and a piggyback member, said slotted segment comprising a portion of said piggyback member.

9. A retractor as set forth in claim 1, wherein said ratchet wheel includes a first piece with an array of teeth engageable by said blocking means and a second piece, said second piece is rotatable with said first piece and is rotatable relative to said first piece, said portion of said ratchet wheel which is deformed by said portion of said spool is a portion of said second piece, said energy dissipating means including a portion of said second piece which deforms a portion of said first piece.

10. A retractor as set forth in claim 9, wherein said second piece being deformed upon rotation of said spool relative to said second piece, said first piece being deformed upon rotation of said spool and said second piece relative to said first piece.

11. A seat belt webbing retractor comprising:
    a rotatable spool around which seat belt webbing is wound;

a ratchet wheel;

a blocking member engageable with said ratchet wheel to block rotation of said ratchet wheel; and an element extending through an opening in said ratchet wheel and attaching said ratchet wheel and said spool for joint rotation, said element having surface means for deforming portions of said ratchet wheel defining the opening in said ratchet wheel to enable said spool to rotate relative to said ratchet wheel upon application of sufficient force to said spool by the webbing when said blocking member is in engagement with said ratchet wheel.

12. A retractor as set for in claim 11, wherein said opening in said ratchet wheel is an elongate slot extending in an arc.

13. A retractor as set forth in claim 12, wherein said ratchet wheel includes a metal wheel and a piggyback member.

14. A retractor as set forth in claim 13, wherein said piggyback member has a portion which is deformed by said surface means of said element.

15. A retractor as set forth in claim 14, wherein said ratchet wheel has a slotted segment through which said element extends with clearance to permit movement of said element along said slotted segment of said ratchet wheel without interference, said portion of said piggyback member which is deformed is a slotted segment through which said element extends without clearance to resist movement of said element along said slotted segment of said piggyback member.

16. A retractor as set forth in claim 15, wherein said piggyback member providing a resistance to rotation of said spool relative to said ratchet wheel which is suitable for a selected use of the retractor.

17. A retractor as set forth in claim 11, wherein said ratchet wheel includes a metal wheel having a portion which is deformed by said surface means of said element.

18. A retractor as set forth in claim 11, wherein said element applies force to said portion of said ratchet wheel to deform said portions of said ratchet wheel and dissipate energy during the rotation of said spool relative to said ratchet wheel.

19. A retractor as set forth in claim 11, wherein said ratchet wheel has a hardness of $R_c=36–42$ and said element has a hardness of $R_c=44–50$.

20. A seat belt webbing retractor comprising:

a spool around which seat belt webbing is wound, said spool being supported for rotation in webbing withdrawal and webbing retraction directions;

a ratchet wheel rotatable with said spool in the webbing withdrawal and webbing retraction directions;

blocking means for preventing rotation of said ratchet wheel and said spool in the webbing withdrawal direction; and means for dissipating energy and for permitting said spool to rotate in the webbing withdrawal direction relative to said ratchet wheel in response to a webbing withdrawal force above a predetermined amount when said ratchet wheel is prevented from rotating by said blocking means, said energy dissipating means including a portion of said spool which deforms a portion of said ratchet wheel;

said portion of said ratchet wheel deformed by said portion of said spool including a slotted segment, said portion of said spool which deforms said slotted segment including a projection extending into said slotted segment;

said ratchet wheel including a metal wheel and a piggyback member, said slotted segment comprising a portion of said piggyback member;

said piggyback member having a hole adjacent to said slotted segment and a web of material between said hole and said slotted segment, said portion of said ratchet wheel being located within said hole prior to rotation of said spool relative to said ratchet wheel, said web of material retaining said portion of said ratchet wheel until a predetermined amount of force is exceeded.

21. A seat belt webbing retractor comprising:

a rotatable spool around which seat belt webbing is wound;

a ratchet wheel;

a blocking member engageable with said ratchet wheel to block rotation of said ratchet wheel; and an element extending through an opening in said ratchet wheel and attaching said ratchet wheel and said spool for joint rotation, said element having surface means for deforming portions of said ratchet wheel defining the opening in said ratchet wheel to enable said spool to rotate relative to said ratchet wheel upon application of sufficient force to said spool by the webbing when said blocking member is in engagement with said ratchet wheel;

said ratchet wheel including a first piece with an array of teeth engageable by said blocking member and a second piece, said second piece being rotatable with said first piece and being rotatable relative to said first piece, said element extending through an opening in said second piece, a second element extending from said second piece to said first piece, said second element having surface means for deforming portions of said first piece to enable rotation of said second piece relative to said first piece.

* * * * *